Sept. 12, 1933.   H. E. BIRKHOLZ   1,926,933
AIR FILTER
Filed Nov. 22, 1928
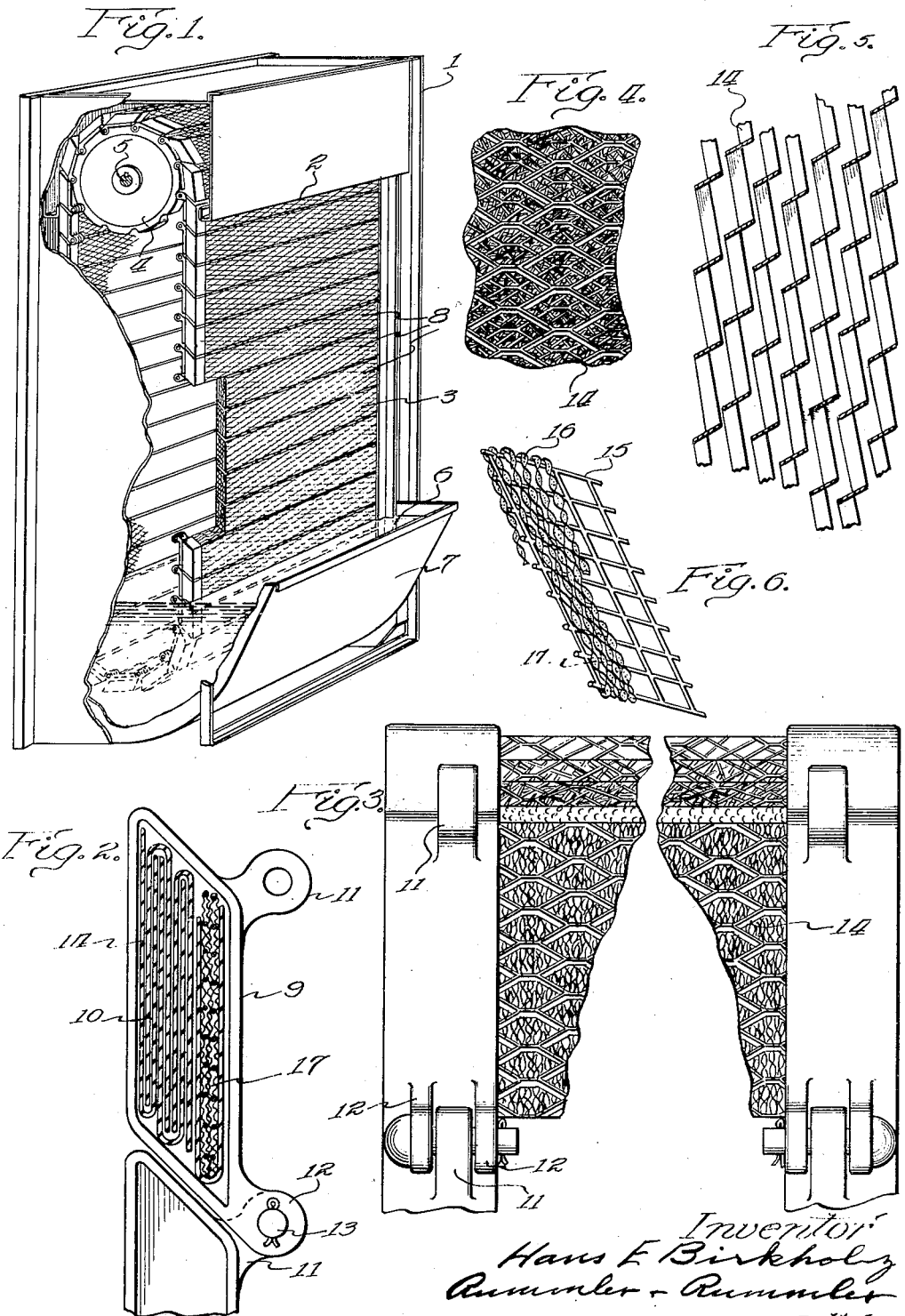

Patented Sept. 12, 1933

1,926,933

UNITED STATES PATENT OFFICE 1,926,933

AIR FILTER

Hans E. Birkholz, Chicago, Ill., assignor, by mesne assignments, to American Air Filter Company, Inc., Louisville, Ky., a corporation of Delaware Application November 22, 1928
Serial No. 321,085

11 Claims. (Cl. 183—63)

This invention relates to air filters for cleansing air used in building ventilation, or removing solid particles from air and gases employed in industrial operations. It is of the class of filtering devices such as illustrated in the patent of F. Aus der Mark No. 1,519,739, dated December 16, 1924, in which a frame structure supports on sprockets a continuous filtering member formed of a chain of metallic plates and extending across an air passageway. The lower end of the chain is preferably immersed in oil so that the surfaces of the elements composing the chain carry a film of oil to which dust particles adhere. By an occasional slight rotation of the supporting sprocket wheels, freshly oiled surfaces of the chain are brought into the path of air passing through the filter and the dirt-laden surfaces of the filtering member are cleansed, the sediment collecting at the bottom of the trough containing the oil bath.

By means of the present invention, the construction, shown in the patent above referred to, is improved particularly in regard to the links or filtering elements of which the chain-like filtering member is composed.

The purposes of the present invention are to increase the efficiency of filters of the class above referred to; to decrease the cost of construction and to provide an arrangement which may be more quickly assembled.

These objects are accomplished by the construction shown in the accompanying drawing, in which:

Figure 1 is a perspective view of the improved filter with parts shown broken away.

Fig. 2 is an enlarged detail showing in cross section the reticular metallic mass forming part of one of the links or filtering elements, of which the filtering member is composed.

Fig. 3 is a rear view, partly broken away, of one of the filtering elements.

Fig. 4 is an enlarged fragmentary front view illustrating the appearance of the reticular metallic mass forming the body of the filtering element.

Fig. 5 is an enlarged sectional detail showing the staggered arrangement of layers or folds of reticulated metal sheets in the filter elements.

Fig. 6 is a fragmentary perspective view of a filtering mat which includes wrappings of flat, twisted wire. These mats are preferably incorporated in each link or filtering element for the purpose of stopping the finer particles of dust which, without them might pass through the coarser metal mesh.

The construction illustrated comprises a metallic cabinet having a large central opening in front and rear for the passage of air therethrough. The cabinet is sealed at the top, and at the bottom contains a trough for oil. Mounted within the cabinet, so as to extend across the air passageway, is the chain-like filtering member. Variable air-cleaning capacity is arranged for by placing a desired number of these cabinets side by side and coupling their sprocket shafts so that a common drive may be provided for all. By occasionally rotating the supporting sprockets of the filtering members, used oil is washed from the surfaces thereof and the filtering members are freshly oiled, due to the lower ends of the filtering members passing through an oil bath.

The general arrangement above referred to may be understood from Figure 1 in which the supporting cabinet 1 may be a sheet metal structure, the panels forming the same being folded together at their ends to provide the required rigidity. The front of the cabinet is provided with a large air intake opening 2 and a similar outlet opening is at the rear of the cabinet. The filtering member or chain 3 is suspended from sprockets 4 on a transverse shaft 5 and extends across the air openings in the front and rear of the cabinet. The air operated upon is therefore caused to pass through the filtering member twice. The lower end of the filtering member is immersed in oil or other suitable cleansing fluid 6 in the trough 7 at the bottom of the cabinet.

The filtering member 3 is composed of a plurality of filtering elements 8, each of which consists of a core 10 of filtering material with its ends compressed into hollow end castings 9. The castings 9 are provided with ears 11 and 12 and adjacent members 9 are pivotally connected by pins 13 extending through said ears. The filtering medium 10 is composed of a plurality of layers or folds of reticulated metal sheets 14 as may be seen from Figure 2. Also between at least a pair of the folds of reticulated metal, there is inserted a mat 17 of much finer mesh. One preferred way of forming this mat is to wrap strips of screen 15 with a fine, twisted, flat copper wire 16.

To further increase the efficiency of these mats in collecting dust particles, the surface of the fine wire 16 is made irregular and increased by minute indentations run into the same by rotating dies.

The metallic mesh or mass composing the body of each link or filtering element is compressed into approximately diamond form in cross section, so that one link partly overlies another, thus preventing leakage of air between the links composing the filtering chain. Also the cross sectional area of this mass, except where it is compressed into the hollow end members, is substantially the same as the area within the outside dimensions of said end members, so that the filtering masses of the links will normally and resiliently bear against each other at the upper and lower ends.

In the operation of this filter, it is necessary occasionally to rotate, or partly rotate, shaft 5. In many uses of the construction, satisfactory results are obtained by moving the filtering member the distance of three or four links, once a day. Dust, which has been caught on the oiled surfaces of the reticular metallic masses forming the links of the filtering member, is released when these links are immersed in the oil bath and settles on the bottom of trough 7. It is, therefore, necessary occasionally to remove the sludge forming at the bottom of the trough. The oil clarifies itself since the dirt does not float on the surface thereof but settles downward. It may, therefore, be seen that the construction illustrated is self cleansing, and that its efficiency is dependent upon the fineness in which the air passing through the filter is cut up and deflected by the metallic body of the filtering elements. An excess of oil on the filtering elements is avoided since the lowermost links which are moved upwardly out of the oil bath only carry a film of oil and are free to drain before being moved further upwardly into the center of the draft of air.

Although but one specific embodiment of this invention has been herein shown and described, it will be understood that details of the construction shown may be altered or omitted without departing from the spirit of this invention as defined by the following claims.

I claim:

1. An air filter of the class in which the filtering member thereof is movably mounted in an air passageway and provision is made for collection of dust by a fluid on the surface of the filtering member, a plurality of pivotally connected filtering elements each composed of a series of superposed layers of reticulated metal and including a mat of closely compacted metallic wire.

2. An air filter of the class in which the filtering member thereof is movably mounted in an air passageway and provision is made for collection of dust by a fluid on the surface of the filtering member, a plurality of pivotally connected filtering elements each composed of a series of superposed layers of reticulated metal and including a mat of closely compacted metallic wire said connected filtering elements being diamond-shaped in cross section.

3. An air filter of the class in which the filtering member thereof is movably mounted in an air passageway and provision is made for collection of dust by a fluid on the surface of the filtering member, a plurality of pivotally connected filtering elements each composed of a series of superposed layers of reticulated metal and including a mat of closely compacted, twisted flat metallic wire.

4. An air filter, comprising supporting structure having a passageway for air, a filter element movably mounted in said passageway and comprising a series of overlapping connected links, each link being composed of superposed layers of reticulated metal one of said layers having strands of wire wound thereon.

5. A filter of the class described in which a chain of filtering elements is mounted for movement across an air passageway, a plurality of links composing said chain, each of said links comprising a reticular metallic mass and hollow end members into which said metallic mass extends.

6. In an air filter a series of filter units arranged one after another, the ends of adjacent units being disposed to extend close together and inclined in one direction at an angle to their faces so that one unit overlaps the other, and means for pivotally connecting each unit to its adjacent unit.

7. In an air filter a body composed of filtering material presenting inlet and outlet faces for the flow of air, and having a side wall composed of filtering material which is adapted for engagement with the side wall of a similar body so as to present, in combination with such similar body, an uninterrupted filtering mass.

8. In an air filter a series of bodies composed of filtering media placed one after another with their adjacent wall portions in contact with each other so as to present a substantially uninterrupted filtering mass, and means for supporting said bodies in such relation.

9. A series of cell like units having side walls composed of filtering material, said units being placed one after another with their side walls in contact with the side walls of adjacent units, and means for engaging and supporting the ends of said units.

10. In an air filter a chain like series of elements, each element consisting of spaced end members and filtering material extending between and supported by said end members, the filtering material of one element extending into engagement with the filtering material of an adjacent element.

11. In an air filter a chain like series of elements, each element consisting of spaced end members, and filtering material extending between and supported by said end members, the filtering material of one element cooperating with the filtering material of an adjacent element to provide a substantially continuous filter area.

HANS E. BIRKHOLZ.